Patented May 20, 1947

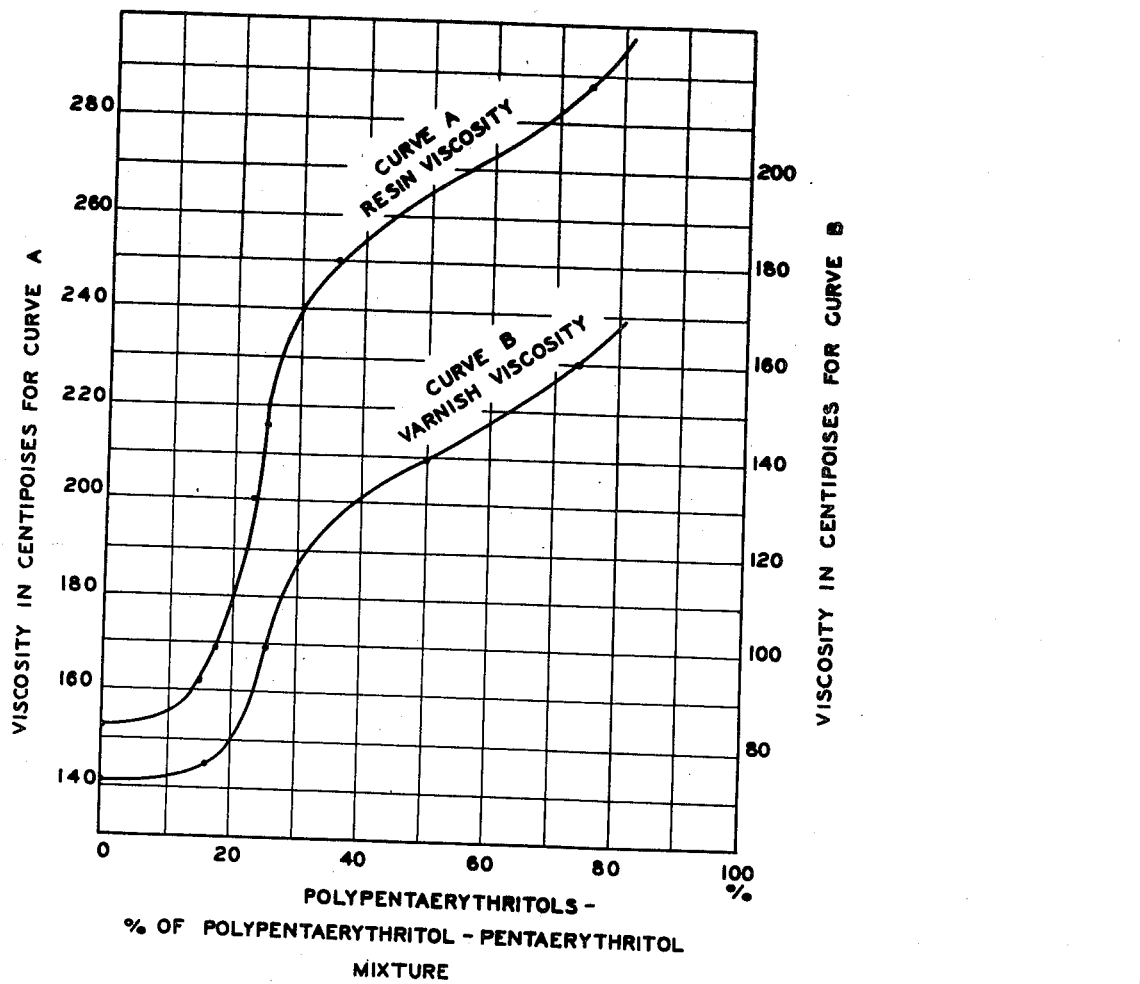

2,420,926

UNITED STATES PATENT OFFICE 2,420,926

POLYPENTAERYTHRITOL ESTERS OF ROSIN ACIDS

Gilbert R. Anderson, Chattanooga, Tenn., assignor to Hercules Powder Company, Wilmington, Del., a corporation of Delaware Application February 2, 1943, Serial No. 474,428

8 Claims. (Cl. 260—104)

This invention relates to rosin esters of polypentaerythritol and to a method for producing the same.

It has heretofore been known to produce certain rosin esters of pentaerythritol, and such esters have been found very useful, particularly in the varnish industry, because of certain valuable properties such as high melting point, hardness, etc. However, resinous esters which have a higher viscosity in themselves and especially a higher bodying effect in the preparation of varnishes by cooking with drying oils are desired. Increased bodying effect is a measure of durability of the varnish film and in addition is highly desirable in varnishes designed for application by brushing.

It has been found in accordance with this invention that rosin acid esters improved in viscosity, in bodying effect when cooking with oils to form varnishes, and in durability of varnish films prepared therefrom are obtained by reacting a rosin acid with a polypentaerythritol at a temperature at which esterification takes place. This procedure yields resins in which the acid groups of the ester involved consist essentially of the rosin acids reacted.

The polypentaerythritol esters of rosin acids produced in accordance with the method of this invention have markedly higher viscosities than corresponding rosin esters of pentaerythritol or of commercial pentaerythritol products containing small amounts of polypentaerythritols, which may be present as impurities. Moreover, it has been found that the polypentaerythritol esters of rosin or modified rosin are exceptionally useful in the preparation of valuable varnishes from the "soft oils." Thus, it has been found that when these new esters are heated with the "soft oils" such as linseed oil, dehydrated castor oil, etc., they produce varnishes which body very rapidly at elevated cooking temperatures without discoloration, and that the films from varnishes so prepared are exceptionally tough and hard. The rapidity of bodying of a "soft oil varnish," and the toughness, hardness, and water and alkali resistance of the film from a varnish so prepared are substantially greater than when the varnish is prepared from the corresponding pentaerythritol esters. In addition, the varnishes produced from the polypentaerythritol rosin acid esters are markedly higher in viscosity than varnishes produced in like manner from corresponding pentaerythritol rosin acid esters.

The alcohols reacting with rosin or modified rosin to form the new esters of this invention, and herein referred to as "polypentaerythritols," are dipentaerythritol and other polypentaerythritols which are of higher order than pentaerythritol and which may be formed along with pentaerythritol in certain methods of carrying out the reaction of acetaldehyde with formaldehyde in the presence of an alkaline catalyst such as calcium hydroxide. This reaction is usually carried out for the purpose of producing pentaerythritol, the polypentaerythritols being formed as by-products and left after separation of pentaerythritol from the reaction products. However, by proper control of the reaction, increased yields of the polypentaerythritols may be realized. The polypentaerythritols, as the term is used herein, are thus polyhydric compounds of greater molecular weight than pentaerythritols which are formed in the condensation of acetaldehyde and formaldehyde under conditions which form chiefly pentaerythritol and appear to be chiefly the polyethers of pentaerythritol, such as dipentaerythritol and tripentaerythritol which serve as examples and which have the following apparent structural formulas:

Dipentaerythritol

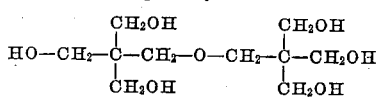

Tripentaerythritol

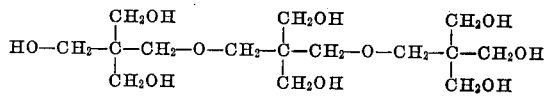

The polypentaerythritols may be separated from pentaerythritol formed therewith to give a raw material substantially free of pentaerythritol, and where products of maximum viscosity, relatively higher melting point and maximum durability in varnish films are desired, the product free of pentaerythritol or containing only a small amount of pentaerythritol is preferred for esterifying the rosin acids. The improvement in viscosity of the resin produced with polypentaerythritol (chiefly dipentaerythritol) over the corresponding pentaerythritol esters and over corresponding pentaerythritol esters in which the pentaerythritol contained as much as 15% of polypentaerythritols is illustrated by comparing viscosities of wood rosin esters thereof, the viscosity being measured in a 60% solution in petroleum hydrocarbon of the varnish maker's type. The comparative figures are as follows:

Table I

| Wood Rosin Ester of | Viscosity |
|---|---|
| | CPS. |
| Pentaerythritol | 154.5 |
| Pentaerythritol containing 15% polypentaerythritol | 162 |
| Polypentaerythritol | 509 |

Where the ester need not be of maximum viscosity, the polypentaerythritol may contain appreciable quantities of pentaerythritol without loss of the viscosity increasing effect. It has long been known that a small amount of polypentaerythritols is formed in the reaction by which pentaerythritol is prepared. This quantity is known by the art to be in the general range of 3–15%. However, there is little or no difference between esters made from pure pentaerythritol and esters made from the commercial product containing this small quantity of polypentaerythritols.

However, it has now been unexpectedly found in accordance with this invention that when the proportion of polypentaerythritols is increased, there is a very sudden critical change as the quantity of polypentaerythritols reaches about 25%. It has now been found that the viscosity of the ester produced when the mixture is reacted with a rosin acid increases very sharply at about 25% polypentaerythritols. The nature of the critical change is shown by curve A in the drawing in which the viscosity of 60% solutions of rosin acid esters of pentaerythritol-polypentaerythritols mixtures are plotted against the composition of the mixture. The drawing also shows by curve B that the effect is carried through to varnishes prepared from the esters. Curves A and B were obtained by plotting the data given in Table II. The viscosities of the resin in the table were obtained in 60% solution in petroleum hydrocarbon varnish maker's thinner having a boiling range of about 160–170° C. and sold under the trade name "Varsol." The viscosities of the varnishes were determined on 50% solutions of the non-volatile components in the same solvent. The varnishes were in all cases prepared in the same manner by heating the resin with linseed oil to 307° C. for one hour and holding at that temperature for one hour and 55 minutes followed by cooling and thinning. In all cases, the proportion of the resin was that represented by 25 gallons of oil per 100 pounds of resin.

Table II

| Polypentaerythritol, per cent | Pentaerythritol, per cent | Viscosity of rosin esters | Viscosity of Varnish |
| --- | --- | --- | --- |
| 0 | 100 | 154.5 | 71.0 |
| 15 | 85 | 162.0 | 73.2 |
| 18 | 82 | 169.6 | ---------- |
| 21.5 | 78.5 | 199.6 | ---------- |
| 24.8 | 76.2 | 217.8 | 99 |
| 29.9 | 70.1 | 239.9 | ---------- |
| 35 | 65 | 250.2 | ---------- |
| 50 | 50 | ---------- | 139.2 |
| 75.3 | 24.7 | 288.0 | 160.2 |
| 100 | 0 | 509 | 250 |

The new resinous esterification products may be produced by esterification of the polypentaerythritols with rosin acids of the type found in wood rosin or gum rosin or such rosins following purification, refinement to remove color bodies, heat treatment and the like. A preferred acid of this group for the preparation of the new resins is abietic acid. In addition, isomeric rosin acids or wood rosin or gum rosin itself, heat-treated rosin, polymerized rosin, hydrogenated rosin, dehydrogenated rosin, "Hyex" rosin (disproportionated rosin), and the like have been found suitable. The term "rosin acid" as used herein refers to any such rosin acid or modified rosin or mixture thereof. The properties of the polypentaerythritol esters formed also depend on the composition and exact chemical nature of the rosin or modified rosin employed. Thus, wood rosin and heat-treated rosins generally yield polypentraerythritol esters of relatively low melting point, gum rosin yielding corresponding esters of higher melting point, and the polymerized rosin may yield corresponding esters of still higher melting point. Hydrogenated rosin yields a corresponding ester of melting point slightly lower than rosin. When polymerized rosin is employed, the degree of polymerization or average molecular weight of the polymerized rosin will affect the melting point of the ester, the polymerized rosins of higher average molecular weight forming the higher melting esters. The examples following will serve to illustrate the extremely high melting point of all the rosin or modified rosin esters of polypentaerythritol, and will also illustrate differences in melting point of the esters of the various rosin acid mixtures employed.

These esters of the polypentaerythritols may be prepared by contacting the rosin acids and the alcohols at elevated temperature. In the absence of catalysts the esterification reaction takes place readily at temperatures above about 270° C. the reaction rate being very slow below this temperature. The reaction temperature should generally be kept below about 300° C. to avoid darkening of the ester. In carrying out the esterification, it is desirable to contact the reacting materials initially at a temperature substantially lower than the reaction temperature, and preferably at a temperature just above the melting point of the rosin or modified rosin employed, then gradually increasing the temperature of the reaction mixture to the desired reaction temperature. This method of heating greatly aids in producing esters of light color. The reaction temperature is preferably maintained within the range of 285° to 295° C., particularly when it is desired to produce the more valuable low acid number esters. Reaction rates are particularly favorable within this range, and the tendency of the esters to darken is small.

If desired, the reaction may be facilitated by the use of a catalyst such as zinc powder or boric acid, although a catalyst is not necessary for the reaction. When such catalysts are employed, the esterification reaction may be carried out at relatively low temperatures, and the esterification has been successfully carried out at temperatures as low as 240° C.

The reaction time depends markedly upon the temperature employed and on the acid number of the ester desired, the concentration and the chemical nature of the reactants, the use of catalyst, etc., so that no fixed time necessary may be given. The examples which follow will serve to indicate generally the time which may be necessary in a given case.

The quantity of polypentaerythritols or mixture of polypentaerythritols with pentaerythritol having more than 25% polypentaerythritols, will in general be at least the stoichiometric equivalent of the rosin acids reacted with on the basis of the hydroxyl content of the polypentaerythritols mixture utilized. To obtain products of desirable low acid number, such as below 25, an excess over the theoretical equivalent is desirable. In general, the polypentaerythritols or polypentaerythritols mixture will be in a quantity between about 90% and about 130% of the stoichiometric equivalent of the rosin acids and preferably the quantity will be between 100 and 120% of this quantity.

It is usually desirable to carry out the esterification in an inert atmosphere such as $CO_2$ or $N_2$, etc., in order to prevent oxidation and discoloration of the esters. Excess polypentaerythritol and other slightly volatile impurities which may be contained in the ester after the esterification reaction has taken place may be removed by sparging, and the melting point of the ester may thereby be increased. In the sparging operation, the slightly volatile materials are swept out of the ester by passing a stream of inert gas such as $CO_2$, $N_2$ or steam through the molten resin preferably at the reaction temperature.

The new resins in accordance with this invention are hard resins characterized by solubility in the drying oils such as linseed oil, commonly used in the preparation of varnishes. The resins have an acid number in most cases below 50 and usually will have an acid number in the range of 5–25. The melting point of the new resin is relatively high but depends in any particular case upon the particular rosin acid which is utilized in the preparation of the resin. Thus, when hydrogenated rosin is used as the rosin acid, the melting point of the resin will be in excess of 107° C., usually about 110–135° C. If the rosin acid is unmodified, i. e., rosin acid as obtained from the free or isomerized only to the extent occurring in purification and refining of the crude rosin, the melting point of the resin will be in excess of about 112° C., usually about 116 to about 135° C. If the rosin acid is polymerized rosin or a polymerized rosin acid, the melting point of the resin is in general above 125° C., usually 135–160° C. Thus, in all cases, a hard resin having a melting point above 107° C. is produced by the method of this invention. Resins made substantially entirely with polypentaerythritols have minimum melting points at least 6° C. higher than the minimum melting points mentioned, which apply to mixtures containing above 25% polypentaerythritols. Such resins thus have a minimum melting point of 113° C.

The resins in accordance with this invention are particularly useful in the preparation of varnishes based on the so-called "soft drying oils," such as linseed oil, soya bean oil, fish oil, Perilla oil, and the like. However they are also useful in coating compositions based on chlorinated rubber in which they add gloss and adhesiveness.

Typical embodiments of this invention relating to new rosin acid esters and a method for their preparation are given in the examples below:

Example 1

Thirteen and five-tenths parts by weight of dipentaerythritol were added to 100 parts by weight of molten N wood rosin. This mixture was heated to a temperature within the range of 285–295° C. and maintained within this range for nine hours. The reaction was carried out in a vessel fitted with an air condenser to allow escape of water formed in the reaction, but to prevent the loss of dipentaerythritol. The reaction was carried out in an inert atmosphere by blanketing with $CO_2$. After the heating period, the reaction mixture was sparged at the reaction temperature of 285–295° C. for one hour. The resulting resin had a color of K+ Standard U. S. Rosin type, an acid number of 10, and a drop melting point of 130° C.

Example 2

Thirteen and five-tenths parts by weight of a crude formaldehyde-acetaldehyde reaction product comprising approximately 75% pentaerythritol and 25% dipentaerythritol were added to 100 parts by weight of molten N wood rosin.

The reaction was carried out exactly as in the previous example with the exception that the reaction mixture was maintained at the reaction temperature for 12 hours. The resin was sparged as in the previous example. The resin produced had a color of WG Standard U. S. Rosin type, an acid number of 12, and a melting point measured by the drop method of 115° C.

Example 3

Thirteen and five-tenths parts by weight of dipentaerythritol were added to 100 parts by weight of molten gum rosin. The reaction was carried out exactly as in Example 1 with the exception that the reaction mixture was maintained at the reaction temperature for 15 hours. The reaction mixture was then sparged for one hour as in the previous examples. The resin produced had an acid number of 12 and a drop melting point of 147° C.

Example 4

A polymerized rosin was prepared as follows:

A benzene solution containing about 25% by weight of wood rosin of color I was treated with 25% by weight of 95% sulfuric acid and kept at a temperature of 13 to 18° C. with stirring for about one hour. The reaction mixture was then allowed to stand for 15 minutes and the benzene solution decanted from the sludge. The benzene solution was then water washed to remove the acid. The polymerized rosin was recovered from the washed benzene solution by evaporating the solvent. This polymerized rosin had a drop melting point of 100° C., and an acid number of 160 and a color M, Standard U. S. Rosin type.

Eleven parts by weight of a crude acetaldehyde-formaldehyde reaction product comprising approximately 75% pentaerythritol and 25% dipentaerythritol were added to 100 parts by weight of the above prepared molten polymerized rosin. This mixture was heated to a temperature within the range of 285° C. to 295° C., and maintained within this range for 12 hours. The reaction was carried out in a vessel fitted with an air condenser to allow escape of water formed in the reaction, but to prevent the loss of the pentaerythritol and dipentaerythritol. An inert atmosphere was maintained by blanketing with $CO_2$. After the heating period the reaction mixture was sparged for one hour at the reaction temperature. The resulting ester had an acid number of 12, a drop melting point of 135° C., and a color of N, Standard U. S. Rosin type.

Example 5

Thirteen and five-tenths parts by weight of dipentaerythritol were added to 100 parts by weight of the polymerized rosin prepared in Example 4 at a temperature slightly above its melting point. The mixture was then heated to a temperature within the range of 285 to 295° C., and maintained within this range for 16 hours. The reaction was carried out in the apparatus of Example 1, and in an atmosphere of $CO_2$. After the reaction period, the reaction mixture was sparged for one hour at the reaction temperature. The resulting ester had a drop melting point of 146° C., a color of N Standard U. S. Rosin type, and an acid number of 15.

Example 6

Example 1 was duplicated exactly except the WG hydrogenated rosin was used in place of wood rosin. The resin resulting had a color of WG Standard U. S. Rosin type, an acid number of 15 and a drop melting point of 126° C.

This is a continuation-in-part of my copending application, Serial No. 389,735, filed April 22, 1941.

What I claim and desire to protect by Letters Patent is:

1. A hard, oil-soluble resinous ester formed by the esterification of reactants consisting essentially of rosin acids and dipentaerythritol.
2. Dipentaerythritol hexa-abietate.
3. Hard, oil-soluble resins formed by the esterification of reactants consisting essentially of polymerized rosin acids and polypentaerythritols having no more than three linked pentaerythritol nuclei.
4. A hard, oil-soluble resinous ester formed by the esterification of reactants consisting essentially of rosin acids and tripentaerythritol.
5. Tripentaerythritol octaabietate.
6. Hard, oil-soluble resins formed by the esterification of reactants consisting essentially of rosin acids and polypentaerythritols having no more than three linked pentaerythritol nuclei.
7. A hard, oil-soluble resinous ester formed by the esterification of reactants consisting essentially of unmodified rosin acids and dipentaerythritol.
8. A hard, oil-soluble resinous ester formed by the esterification of reactants consisting essentially of unmodified rosin acids and tripentaerythritol.

GILBERT R. ANDERSON.

REFERENCES CITED

The following references are of record in the file of this patent:

UNITED STATES PATENTS

| Number | Name | Date |
|---|---|---|
| 2,275,494 | Bennett | Mar. 10, 1942 |
| 1,820,265 | Bent et al. | Aug. 25, 1931 |
| 2,251,236 | Wyler | July 29, 1941 |
| 2,025,612 | Rodman | Dec. 24, 1935 |

OTHER REFERENCES

Crebert, Fette und Seifen, vol. 46, May 1939, pages 287–289.